United States Patent [19]

Carlin et al.

[11] 4,161,220

[45] Jul. 17, 1979

[54] METHOD AND APPARATUS FOR PRETENSIONING SCREW JOINTS

[75] Inventors: Carl-Gustaf Carlin, Tyresö; Stefan M. B. Skyllermark, Nacka, both of Sweden

[73] Assignee: Atlas Copco Aktiebolag, Nacka, Sweden

[21] Appl. No.: 852,600

[22] Filed: Nov. 17, 1977

[30] Foreign Application Priority Data

Nov. 22, 1976 [SE] Sweden ............................... 7613005

[51] Int. Cl.[2] ............................................. B23Q 19/06

[52] U.S. Cl. ............................................ 173/1; 173/12

[58] Field of Search .................. 29/240; 73/88 F, 139; 81/52.4 R, 52.5; 173/1, 12

[56] References Cited

U.S. PATENT DOCUMENTS

| | | | |
|---|---|---|---|
| 3,939,920 | 2/1976 | Hardiman et al. | 173/1 |
| 3,974,685 | 8/1976 | Walker | 173/12 X |
| 3,974,883 | 8/1976 | Sigmund | 173/12 |
| 3,982,419 | 9/1976 | Boys | 173/12 X |
| 4,014,208 | 3/1977 | Moore et al. | 73/88 F X |
| 4,016,938 | 4/1977 | Rice | 173/12 X |
| 4,026,369 | 5/1977 | Vliet | 73/88 F X |

*Primary Examiner*—Lawrence J. Staab
*Attorney, Agent, or Firm*—Flynn & Frishauf

[57] ABSTRACT

A method and apparatus for tightening a screw joint to a predetermined axial load $F_p$ providing the spring constant $k=F/\phi$ of the joint is known, wherein the joint stiffness or torque/rotation radient $dM/d\phi$ is calculated during the tightening process and the torque application on the joint is interrupted as a torque level $M_s$ is obtained that according to the spring constant or axial load/rotation relationship $F/\phi$ and the calculated joint stiffness $dM/d\phi$ corresponds to the predetermined axial load $F_p$.

4 Claims, 3 Drawing Figures

METHOD AND APPARATUS FOR PRETENSIONING SCREW JOINTS

BACKGROUND OF THE INVENTION

This invention relates to a method and an apparatus for tightening a screw joint to a predetermined axial load.

According to the most common joint pretensioning method the joint is tightened to a certain torquelevel. This torque level has been determined experimentally to correspond to a desired tension in the joint. Due to variations in friction, this method suffers from very large deviations in obtained axial load.

A previously known method to avoid this drawback is described in U.S. Pat. No. 3,939,920. According to the described method, the screw joint is tightened to its yield point and the applied torque at this point is registered. This method is based on the fact that at the yield point a certain axial load is obtained in relation to a certain torque. This torque is in turn dependent on the actual friction forces in the joint. From this relationship it is possible to determine the obtained axial load at the yield point by measuring the applied torque. Thereby, the axial load/torque relationship is determined for a certain joint. In order to obtain a desired axial load in a joint according to this method the joint is tightened to its yield point in order to establish the actual load/torque relationship, whereupon the joint is slackened and retightened to a torque level which corresponds to the desired axial load magnitude. This previously known method suffers from two serious sources of error which seriously impair the accuracy of the obtained axial load. One of these is due to the fact that, in the theoretical basis for determining the axial load at the yield point, it has been assumed that the friction forces are of the same magnitude in the thread as beneath the head of the screw or the nut. This is the case in exceptional cases only and, normally, there is obtained deviations in the axial load. The theory is based on the fact that the friction forces in the thread of the joint give rise to a torsion load in the screw which affects the torque obtained at the yield point. The friction forces acting under the head of the screw or/and the nut also result in an augmented torque level but does not influence upon the tension of the screw. Variations in the friction forces beneath the screw head and/or nut therefor cause deviation in the obtained axial load.

The other source of error in this known method relates to the fact that the joint has to be tightened twice. However, at the second tightening, the friction forces in the joint are considerably less than at the first tightening, which means that the torque magnitude which was estimated to give the desired axial load from the first tightening will be too high. Moreover, the variations in the friction reduction are considerable.

In addition, this known method requires a relatively long cycle time and a complicated control system for the nutrunner.

The object of the present invention is to solve this problem, which is accomplished by the invention as it is defined in the claims.

FIG. 1 is a diagram showing the axial load/rotation relationship in a screw joint, FIG. 2 shows a diagram in which the torque/rotation relationship of the screw joint is illustrated, and FIG. 3 shows schematically a nutrunner provided with a control unit according to the invention.

DETAILED DESCRIPTION

The screw joint pretensioning method according to the invention is based on the fact that the spring constant of a screw joint varies within very narrow limits only. This is the fact especially at joints in which the components are manufactured and machined with explicit care. Such joints are to be found at crank shaft bearing caps and cylinder heads of internal combustion engines. In such joints there are still some considerable variations in the friction forces, and the main object of the invention is to accomplish an accurate predetermined axial load in the joint without being influenced by the friction forces. To this end the angle of rotation in the joint is used as a reference instead of the installed torque.

Figure 1:
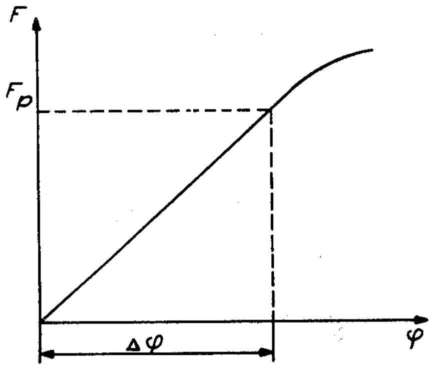

Thus, the tightening process according to the invention is based on the fact that the spring constant k, i.e. the axial load/rotation relationship $F/\phi$ for the joint is known. This relationship is determined experimentally by measuring the axial load and the angle of rotation at a number of joints of the actual type. The obtained mean value may be illustrated graphically as in FIG. 1 where F designates the axial load, $\phi$ the angle of rotation and $\Delta\phi$ the specific angle of rotation which corresponds to the desired axial load $F_p$.

Figure 2:
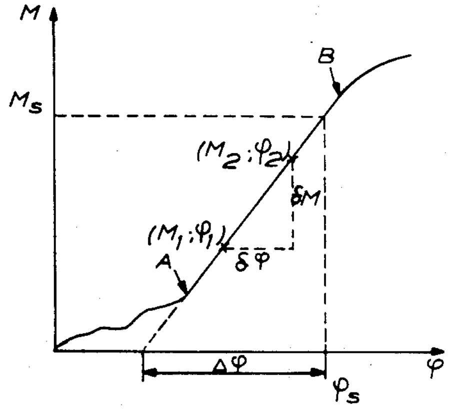

In FIG. 2, there is graphically illustrated a typical such relationship at tightening of a joint up to the yield point. The curve illustrates how the tightening process comprises three different sequences, namely a first sequence from zero to point A, a second sequence from point A to point B and a third sequence above point B. The first sequence, ending at point A on the curve, illustrates the running down process of the screw or nut and comprises a very uneven torque growth. At point A, the tightening process is continued with the second sequence which is linear and which represents an increased elastic pretensioning of the joint. From point B on, the third sequence starts and shows a decreasing torque growth as a result of plastic deformation of the joint. Point B represents the yield point of the joint.

So, the linear part of the curve illustrates the elastic deformation of the joint, which is caused by an increasing axial load. The gradient of the curve corresponds to the stiffness of the joint.

The pretensioning method according to the invention means that the torque/rotation gradient ($dM/d\phi$) is determined between two arbitrarily chosen points $M_1$, $\phi_1$, $M_2$, $\phi_2$ on the curve. The latter point, however, has to be chosen in such a way that $M_2$ will not exceed the final shut off moment $M_s$ which is around the end of the linear portion of the curve of FIG. 2. As is also clearly illustrated in FIG. 2, the points $M_1\phi_1$ and $M_2\phi_2$ are chosen to be in the linear elastic deformation range of the joint, as should be apparent to those skilled in the art.

The calculated torque/rotation gradient $dM/d\phi$ is multiplied by the angle of rotation which, according to the experimentally determined spring constant k, corresponds to the desired axial load $F_p$. The obtained product, which has the dimension of torque, expresses the torque $M_s$ at which the tightening of the joint shall be interrupted in order to obtain the desired axial load $F_p$.

Figure 3:
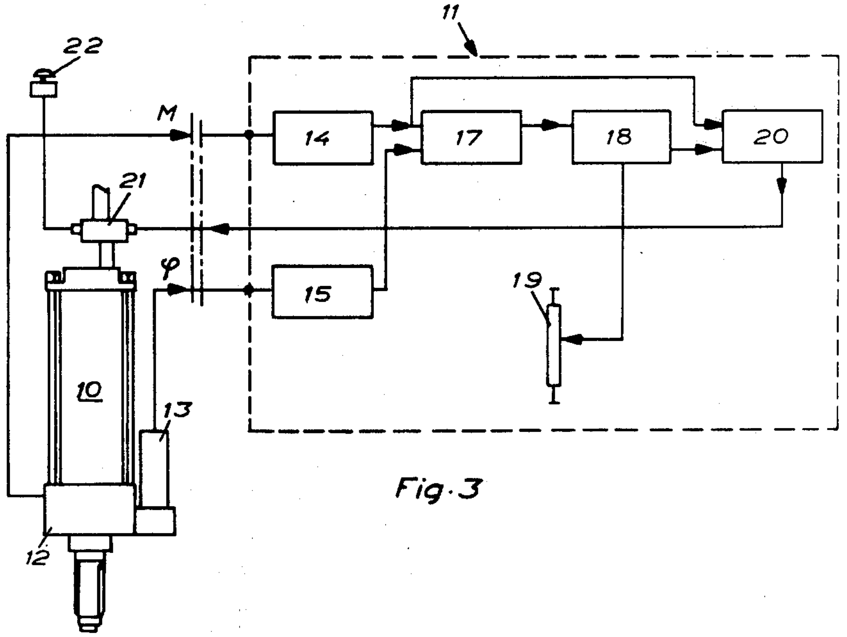

In FIG. 3 there is schematically shown a pneumatic nutrunner 10 and a control unit 11 connected thereto. The control unit 11 has two inputs A and B which are connected to torque sensing and rotation sensing means 12 and 13, respectively, on the nut runner 10. The nut runner 10 and the sensing means, are not shown in detail as they do not form a part of the invention.

Moreover, the control unit 11 comprises a signal amplifier 14 and a signal conditioner 15 for treatment of the torque and rotation signals received from the nut runner 10. The control unit 11 further comprises a calculating device 17 for determining the torque/rotation gradient $dM/d\phi$, a multiplier 18, a voltage divider 19 and, a comparator 20. The apparatus also comprises a servo operated inlet valve 21 for motive air to the nut runner 10, and a trigger switch 22 connected to inlet valve 21.

To obtain a predetermined tension in a screw joint connected to the nut runner, the latter is started by activation of trigger switch 22. The torque and rotation sensing means 12,13 starts to deliver signals to the control unit 11. The torque/rotation gradient $dM/d\phi$ is determined by the calculator 17 and is multiplied by a factor $F_p/k$ in the multiplier 18. The factor $F_p/k$ is formed by the quotient of the desired axial load $F_p$ and the experimentally determined spring constant k of the joint and expresses the angle of rotation $\Delta\phi$ over which the joint has to be tightened to obtain the axial load $F_p$. This factor is set on the voltage divider 19 which is connected to the multiplier 18. In the multiplier 18 the gradient $dM/d\phi$ is multiplied with the factor $F_p/k$ and the product $dM/d\phi$ is obtained.

Since $dM/d\phi$ represents the stiffness of the actual joint, the calculated product corresponds to the torque to which the actual joint has to be tightened in order to obtain the desired axial load $F_p$.

This calculated torque value is compared in the comparator 20 with the actual torque, the signal of which is supplied directly from the nut runner 10, and, as the actual torque has reached its calculated value, the comparator 20 will initiate shutting off of the nut runner 10. This is obtained in that an output signal is supplied to the inlet valve 21 of the nut runner 10, whereby the inlet valve is shifted to interrupt the air supply to the nut runner 10. Then, the screw joint is pretensioned to the desired axial load.

The embodiments of the invention are not limited to the shown and described example, but can be freely varied within the scope of the invention as it is defined in the claims.

We claim:

1. Method for pretensioning a screw joint to a predetermined axial load ($F_p$), the axial load/rotation relationship ($F/\phi$) for the screw joint being known, comprising the steps of:

measuring the instantaneous magnitude of the applied torque and the angle of rotation within the linear elastic deformation range of the joint, calculating the torque/rotation gradient ($dM/d\phi$), applying a tightening torque to the screw joint, sensing when the screw joint has been tightened to a torque level ($M_s$) which, according to the calculated torque/rotation gradient ($dM/d\phi$) and the previously known axial load/rotation relationship ($F/\phi$), corresponds to said predetermined axial load ($F_p$), and discontinuing said applied tightening torque responsive to said sensing when the screw joint has been tightened to said torque level ($M_s$).

2. Method according to claim 1, wherein the torque/rotation gradient ($dM/d\phi$) calculation is based upon the mean change in torque and angle of rotation between two given points ($M_1$, $\phi_1$; $M_2$, $\phi_2$) within the linear, elastic deformation range of the joint.

3. Apparatus for tightening a screw joint to a predetermined axial load ($F_p$) where the axial load/rotation relationship ($F/\phi$) of the joint is known, comprising:

means (10) for delivering a torque to the screw joint, means (12,13) coupled to said torque delivering means for sensing the instantaneous torque magnitude and angle of rotation of the screw joint and for generating signals in response thereto, a control unit (11) which is connected to and receiving signals from said sensing means (12,13) and which comprises:

calculating means (17) for determining the torque/rotation gradient ($dM/d\phi$), and means (20) coupled to said calculating means and to said torque delivering means for initiating shut off of said torque delivering means (10) upon reaching a torque magnitude ($M_s$) which, according to the calculated torque/rotation gradient ($dM/d\phi$) and the previously known axial load/rotation relationship ($F/\phi$) corresponds to said predetermined axial load ($F_p$).

4. Apparatus according to claim 3, wherein said torque delivering means (10) is a pneumatic nut runner comprising an air inlet valve (21) which is closable by said control unit (11) as said calculated shut off torque level ($M_s$) is reached.

* * * * *